United States Patent [19]
Bluthardt et al.

[11] 3,817,369
[45] June 18, 1974

[54] APPARATUS FOR PROCESSING AND STORING ROD-SHAPED DOUGH

[75] Inventors: Eberhard Bluthardt, Stuttgart; Werner Hoschele, Beutelsbach; Walter Spinner, Backnang, all of Germany

[73] Assignee: Hofliger & Karg, Waiblingen, Germany

[22] Filed: May 10, 1972

[21] Appl. No.: 251,973

[30] Foreign Application Priority Data
May 18, 1971 Germany............................ 2124487

[52] U.S. Cl. ............................................... 198/44
[51] Int. Cl. ............................................. B65g 13/02
[58] Field of Search ............. 198/44, 56, 66, 69, 45, 198/46, 47, 48, 49, 51, 43; 222/56; 214/16 R

[56] References Cited
UNITED STATES PATENTS
570,251   10/1896   Frith ............................ 214/16 R X
837,518   12/1906   Tobias ................................ 198/44
1,015,251   1/1912   Schraeder ..................... 214/16 R X Primary Examiner—Evon C. Blunk
Assistant Examiner—Douglas D. Watts
Attorney, Agent, or Firm—Michael S. Striker

[57] ABSTRACT

Spaghetti, macaroni and other rod-shaped dough are divided into rods, which are stored in horizontal position in vertical compartments of several containers. A bucket conveyor supplies equal amounts of rods from the buckets into the upper ends of the compartments. The containers are shiftable on rails by electric motors to place the compartments of all containers successively and selectively under the bucket conveyor. After storage in the container compartments, the lower ends of the compartments are opened for discharge onto a conveyor leading to a packing machine. If the packing machine cannot process the delivered rods, the rods are returned to the bucket conveyor and stored in the container compartments.

10 Claims, 5 Drawing Figures

Fig. 5

APPARATUS FOR PROCESSING AND STORING ROD-SHAPED DOUGH

BACKGROUND OF THE INVENTION

The present invention relates to an apparatus of processing rod-shaped dough, such as spaghetti, macaroni and the like which, on the way between a drying station and a packing station have to be treated in various ways, for example sawed, divided, and weighed, and, if required, also stored for long time periods. The present invention also relates to an apparatus for effecting the storing in a particular advantageous manner.

During the manufacture of spaghetti, macaroni, and the like, it is customary to transport the spaghetti during drying, and storing in a suspended condition. In the dryer and in the storing containers, rotating bars and the like over which spaghetti are hanged are used. A sawing apparatus follows the storing container, such as a silo, which divides the spaghetti at the center and also severs the bent portions of the spaghetti. Thereupon, the divided spaghetti are transported to one or several packing machines.

When a large amount of spaghetti is stored in the manner of the prior art, difficulties arise inasmuch as a very great room is required if the output of an entire working shift for example of the second day shift and of the night shift, has to be stored. This is necessary since for several reasons immediate packing of the spaghetti manufactured during the second shift and the night shift, is not possible. Considering the fact that under such circumstances 40 to 50 tons of spaghetti are produced, the storing arrangements according to the prior art cannot be considered economical. This is due to the fact that, since the spaghetti are stored in hanging condition, and are then about 50 cm long, a great deal of room is required, and furthermore, a great number of bars, chains, reversing wheels is necessary for suspending the spaghetti.

SUMMARY OF THE INVENTION

It is one object of the invention to store a great amount of spaghetti, macaroni, or the like economically in a simple manner in a small space.

With this object in view, the present invention provides an apparatus in which the spaghetti, macaroni, and the like are stored between the sawing operation and the packing operation. The spaghetti rods produced by sawing of the rod-shaped extruded dough, are collected in equal amounts, stored, and then again transported in equal amounts or continuously to the packaging station. The spaghetti and the like can be stored above each other, side-by-side, or following each other. Due to the fact that the suspension on bars is eliminated, and the severed spaghetti rods can be stacked in closely adjacent parallel positions, much less room is required as compared with the processing of spaghetti according to the prior art.

In the arrangement of the invention, it is not only possible to store the output of the night shift, for example, but it is also possible to transport equal predetermined amounts of the spaghetti to one or several packing machines, and to store the respective amounts of spaghetti rods if the packing machines are inoperative due to a standstill, or excess of the working capacity of the machine. When the condition of the packing machines again permits operation, the stored spaghetti are released and transported to the packing machines.

In the apparatus of the invention dough rods sawed to equal lengths, are stored in a horizontal position in vertical elongated compartments which may be arranged adjacent each other and/or behind each other in an upright position. Several compartments are combined in a container, and several containers can be independently moved relative to first transporting means which are located above the containers, and second transporting means which are located below the containers. Due to the fact that each container has a row of container compartments, and can be shifted to a position to be filled or emptied, a very space-saving arrangement is obtained, and the container compartments can be easily filled and emptied, as selected.

One or several bucket conveyors, or conveyor belts may be used for transporting the spaghetti rods to the compartments to be filled. If a bucket container is used, each container with a row of vertical compartments, is associated with an actuating means by which the closing flaps of the buckets are opened only in the region of the row of compartments which are to be filled. For this purpose, each container is provided with an actuating lever by which the moment of discharge of the bucket can be determined. A number of buckets can be discharged into each compartment, and the container is then moved one step for discharge of buckets into the next following compartment. After the filling of the last compartment of a row forming a container, the actuating lever of this container is moved out of the path of movement of the buckets, while the respective actuating lever of the next following container and row of compartments is moved into the path of movement of the buckets. For this purpose, each container with a row of compartments is associated with photoelectric sensing means which determine the moment of the switching from one container to the other container. Drive means are provided for moving each container with the row of compartments across the bucket conveyor, and such drive means are started and stopped by photoelectric sensing means.

At the lower end, each compartment has a closure slide which is normally in a closed position, permitting filling of the respective compartment, and which is operable by operating means, one operating means being provided for each container with the row of compartments.

Furthermore, each container is associated with a connecting chute which can be brought into alignment with the lower end of each container compartment, and is normally closed by a weight biassed closure. The connecting chute of each container can be connected with each compartment of the respective row with an annular connecting ring which closes the gap between the outlet of the respective compartment and the connecting chute so that a lateral discharge of spaghetti rods is prevented.

Preferably, each container is provided with sensing means for starting a displacement of the container depending on the filling condition of the respective sensed compartment. Photoelectric devices may be used which control the drive means so that when the empty condition of the compartment is sensed, the drive means are started to move the respective container one step so that the next compartment is in the position for discharging to the discharge conveyor.

When the last compartment of a container has been emptied, a corresponding electric circuit effects movement of the next following container to a position in which its first leading compartment is positioned for discharge onto the conveyor, and this operation is repeated until all compartments of all containers have been driven to the discharge position above the discharge container, and then returned to their initial positions.

Evidently, for filling and emptying the compartments of the containers, several conveyor bands, bucket conveyors, or the like may be provided which are connected with several drying stations and packing machines. The apparatus of the invention also permits the filling and emptying of compartments of several containers at the same time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a schematic and diagrammatic side elevation illustrating the use of the storing apparatus of FIGS. 1 to 4 in an arrangement for automatically transporting, storing, and packing rods consisting of dough, and the like.

DESCRIPTION OF THE PREFERRED EMBODIMENTS

Figure 1:
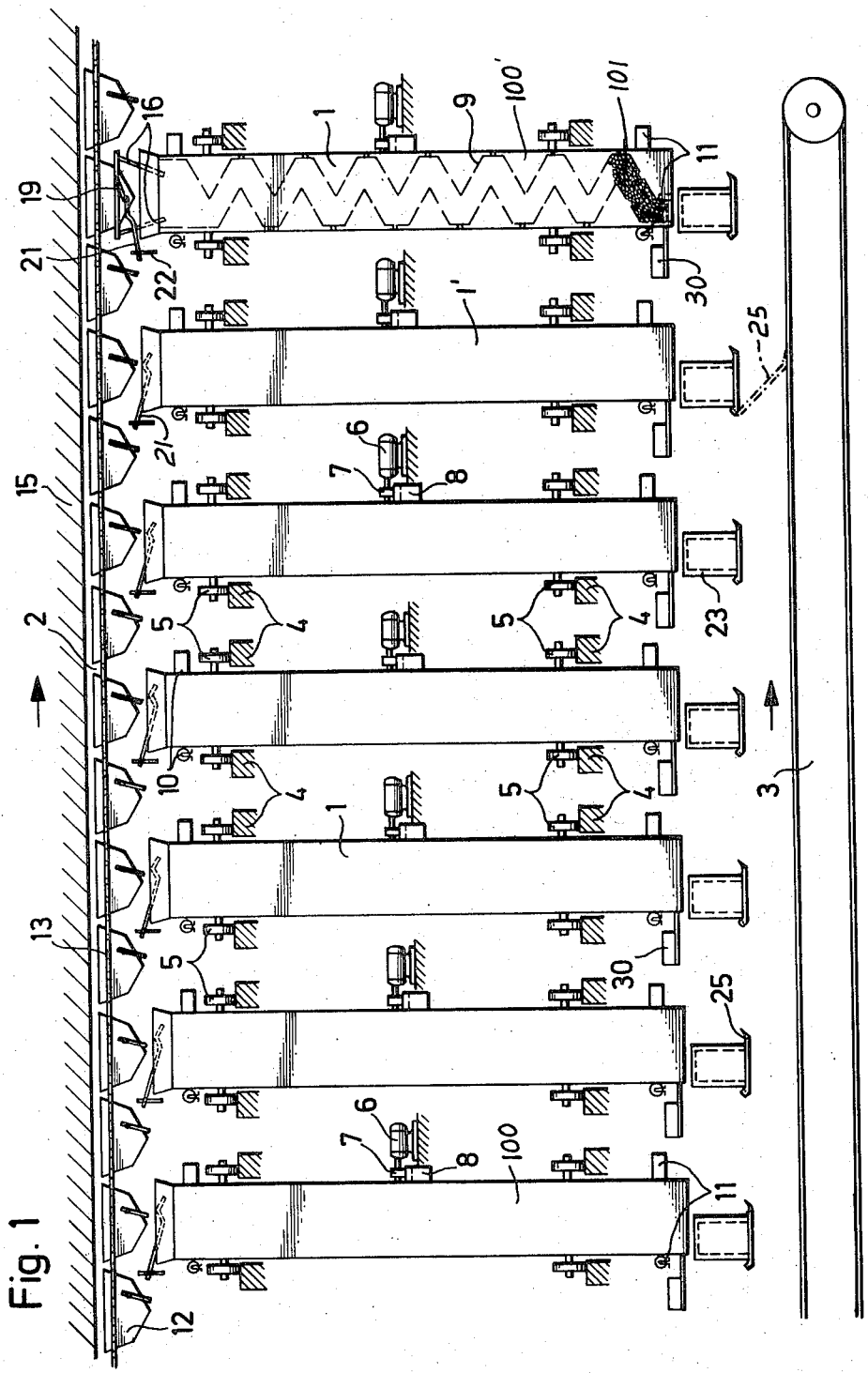
FIG. 1 is a side elevation of a storing apparatus according to the invention.
Figure 2:
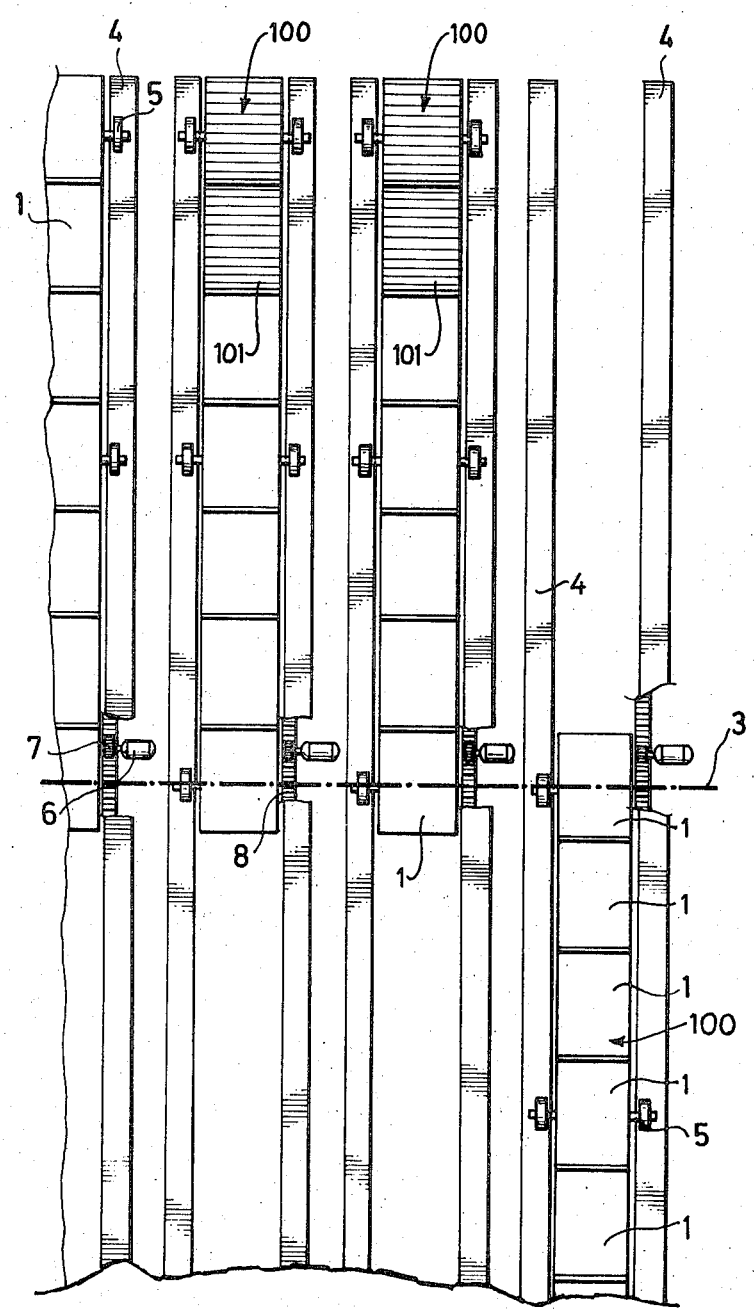
FIG. 2 is a fragmentary plan view of the apparatus shown in FIG. 1.

As best seen in FIGS. 1 and 2, a plurality of containers 100 is provided, each container 100 having a row of vertical elongated compartments 1. The containers 100 cooperate with first transporting means 2, in the form of a bucket conveyor which are located above the upper ends of the containers 100 and of the respective compartments 1. Below the lower ends of the containers 100 and compartments 1, second transporting means 3 in the form of a conveyor belt are provided. In the illustrated embodiment seven compartments are arranged in a straight row to form a container 100, and seven containers are provided. Evidently, each container may have a greater number of compartments, and a greater number of containers 100 may be provided, depending on the maximum amount which can be stored in all compartments of all containers.

Each container 100 has supporting rollers 5 which run on rails 4 so that each container 100 can be moved across the supply conveyor 2 and the discharge conveyor 3 so that the compartments 1 of each container can be successively placed in a position for receiving the rods from the supply conveyor 2, or for discharging rods onto the discharge conveyor 3. After seven steps, the last compartment of each container is filled or emptied, and the entire container 100 may be moved to an inoperative position, and the first compartment 1 of the next following container 100 may be filled or emptied. Conveyors 2 and 3 may be located in the same vertical plane, and move perpendicularly to the direction of the rails 4. In order to move each container 100 across the conveyors 2 and 3, a drive motor 6 is provided for each container which has a drive gear 7 meshing with a rack bar 8 secured to the respective container.

The transverse horizontal width of the containers 100 and of the compartments 1, is selected to match the length of the dough rods 101, so that the rods can be placed in the compartment in horizontal parallel positions, as shown in FIGS. 1 and 2. As best shown for compartment 1' in FIG. 1, each compartment 1 is provided with a zigzag baffle guide 9, which prevents a misalignment of the dough rods during the filling and emptying of the respective compartment. Photoelectric sensing devices 10 and 11 are provided for each container 100 in the regions of the upper and lower ends, so that in the seven displaced positions of each container 100, the filling condition of one compartment 1 thereof can be sensed.

Figure 3:
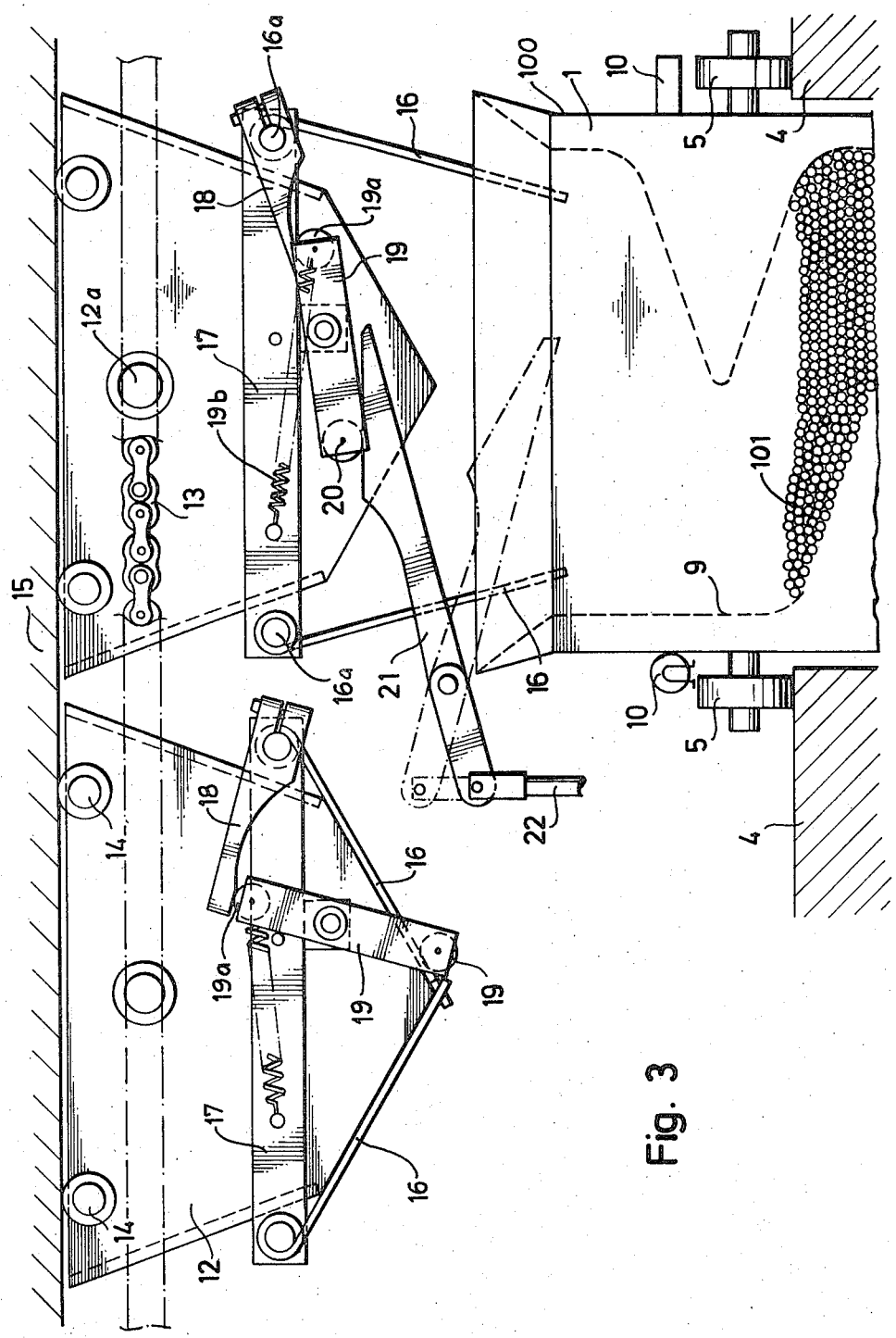
FIG. 3 is a fragmentary view illustrating the filling operation of the apparatus, shown at an enlarged scale.
Figure 5:
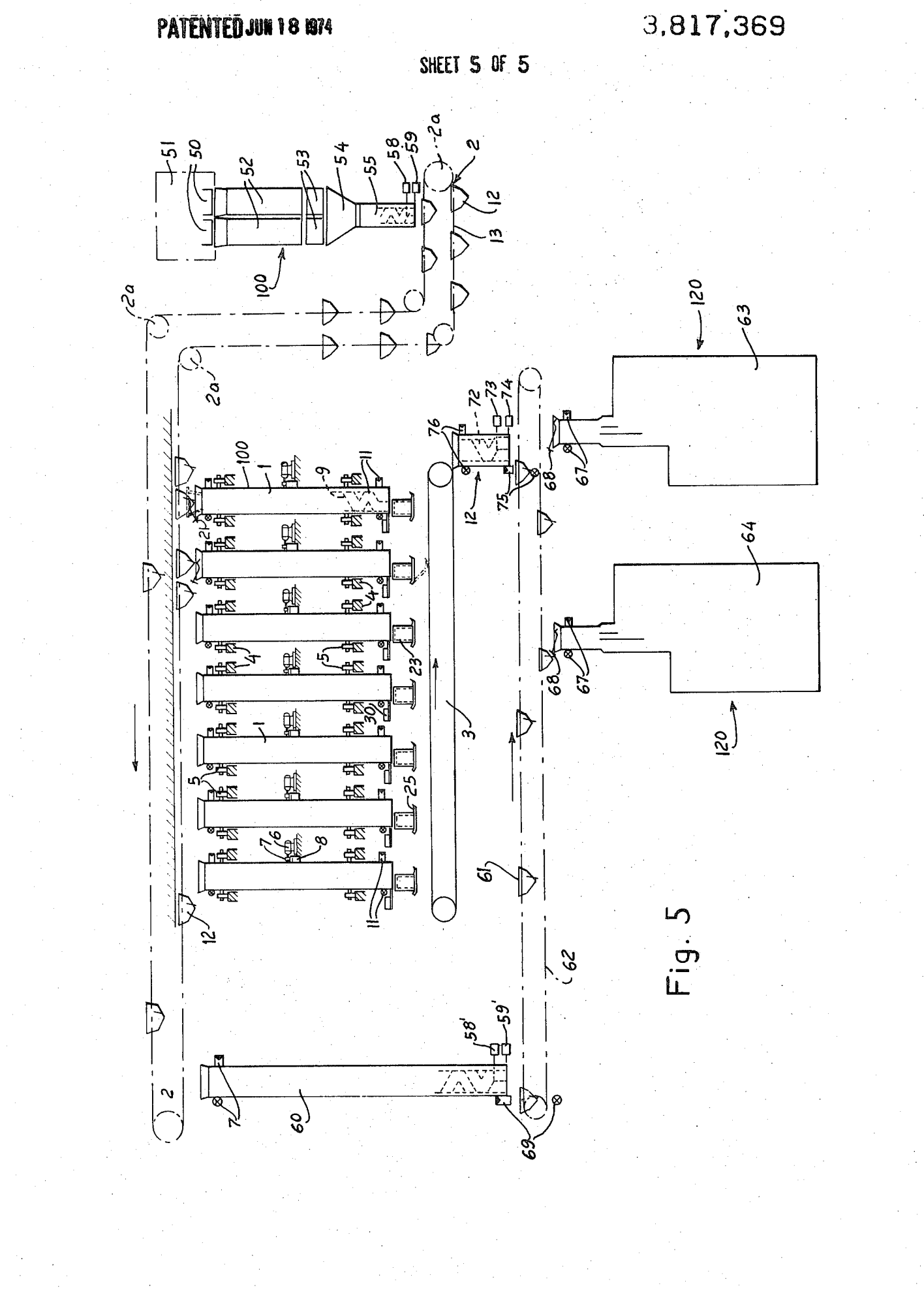

The supply conveyor 2 is constructed as a bucket conveyor including a chain 13 supporting buckets 12 for angular movement on pivots 12a, as best seen in FIG. 3. Each bucket has two rollers 14 which run along a guide surface 15 so that the buckets 12 cannot be pivoted during filling of a compartment, but can be turned when passing over reversing chain wheels 2a, as shown in FIG. 5. The buckets 12, and more particularly the closing flaps 16, which are pivotally mounted at 16a, are opened by a lever system 17, 18, 19 when an actuating lever 21 is placed by the shiftable rod 22 in the operative position shown in solid lines in FIG. 3 in which a guide face on actuating lever 21 engages the roller 20 of the lever 19 which is tensioned by spring 19b, and has a roller 19a cooperating with a curved cam surface of lever 18. In the closed position of a bucket, as shown on the left in FIG. 3, spring 19b pulls lever 19 to a position turning lever 18 together with the respective closing flap 16 which holds the other closing flap also in the closed position. When actuating lever 21 turns lever 19, as shown in the right in FIG. 3, the respective bucket opens and discharges its contents of rods 101 into the upper open end of the respective compartment 1. The actuating device 21, 22 is common to all compartments 1 of a container 100, and the respective compartments 1 can be successively placed under the bucket conveyor with roller 5 rolling on rails 4. Actuating lever 21 is actuated by the rod 22 which is controlled by an electromagnet, not shown, which is actuated depending on the filling condition of the respective compartment 1 sensed by the sensing means 10. When the dough rods 101 rise above the level of the photoelectric sensing means 10, a pulse is generated which controls the electromagnet, not shown, to operate actuating rod 22 to move actuating lever 21 to the position shown in broken lines in which spring 19b can pull lever 19 to a position effecting closing of the respective bucket 12 by the closing flaps 16.

Figure 4:
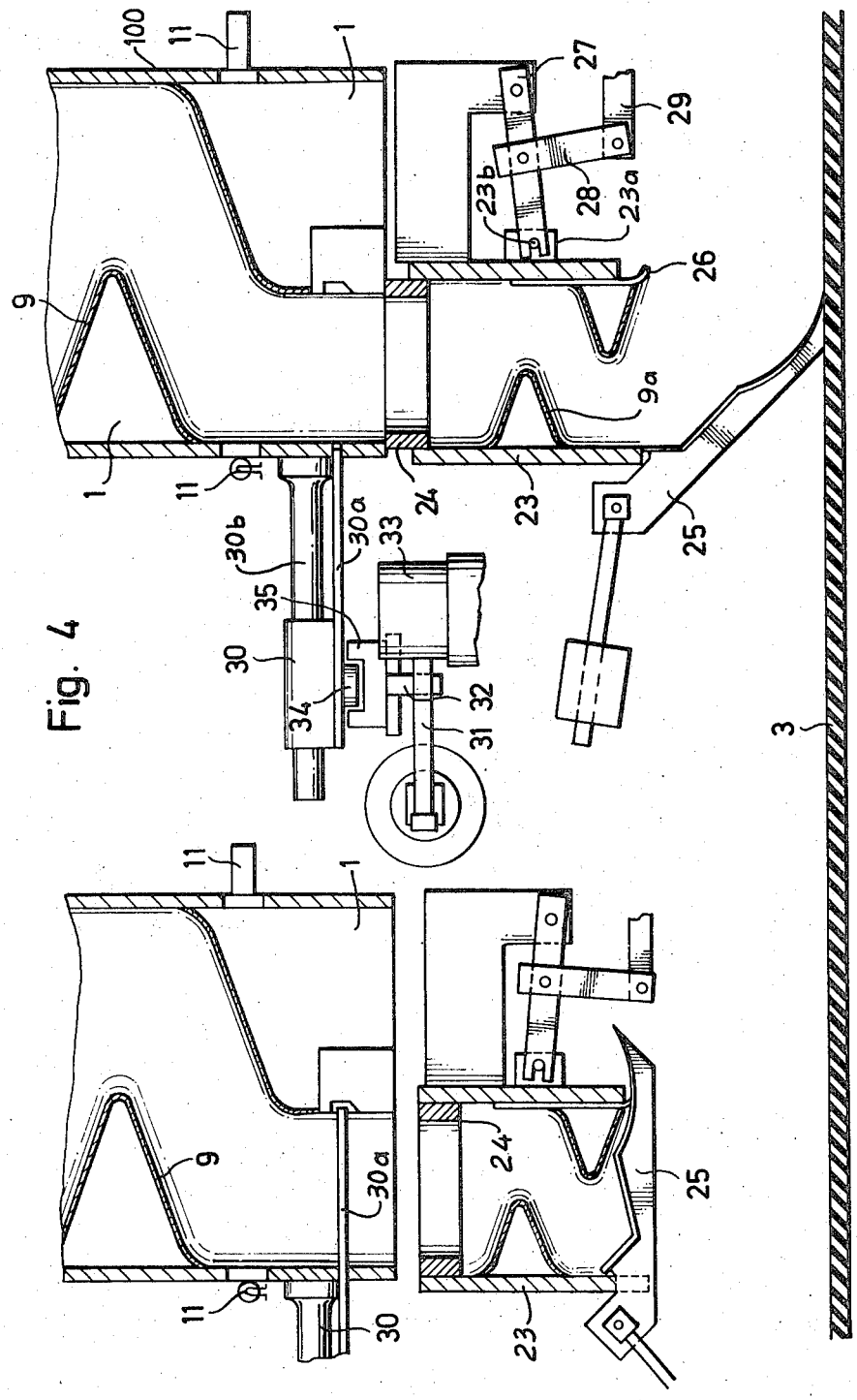
FIG. 4 is a vertical sectional view illustrating the discharge region of the apparatus on an enlarged scale.

The cooperation of the compartments 1 with the discharge conveyor belt 3, is best seen in FIG. 4. Each container 100 is associated with a stationarily mounted connecting chute 23 which is normally closed by a weight biassed closure 25, as shown on the left of FIG.

4. In this normal position, the upper end of the chute 23 is spaced from the outlet of the respective compartment 1, which is closed by a closure slide 30a. In the upper end of chute 23, a connecting ring 24 is mounted which can be shifted to the operative position shown on the right in FIG. 4, forming a continuous passage between the compartment 1 and the chute 23 so that the discharged rods cannot laterally spill. The outlet of each compartment 1 can be successively connected with the connecting chute 23 by operation of the connecting ring 24 after the respective container 100 has been moved one step along the rail 4.

Since the maximum height of the dough rods loaded onto the discharge conveyor 3 is determined by the distance of the lowest edge 26, it is necessary to raise each connecting chute in the closed condition of the closure 25 so that the dough rods lying on the discharge conveyor belt 3 are not pushed against the bottom faces of the closure flaps 25 of other containers. In order to shift connecting chute 23 accordingly, a lever system 27, 28, 29, and a pivot 23b on a projection 23a on connecting chute 23 are provided so that, when an electromagnet, not shown, operates link 29, the connecting chute 23 is raised, as shown on the left in FIG. 4.

As shown in FIGS. 4 and 1, a closure slide 30a is provided for each compartment 1 and mounted by means of a bushing 30 on a shaft 30b. The closure slide 30a with bushing 30 is operated under the control of an electromagnet 33 which is connected by articulated levers 31, 32 which shift a guide member 35 cooperating with a roller 34 on the bushing 30 so that upon energization of the electromagnetic 33, the closure slide 30a is shifted from the open position shown on the right side to the closed position shown on the left side of FIG. 4.

The shifting to the next following compartment 1 after emptying of another compartment of the same container, as well as the shifting from one container 100 to the next container 100 after emptying of the last compartment 1 of the preceding container 100, is carried out under the control of photoelectric sensing means 11.

As particularly shown in FIG. 1, the buckets 12 are first filled at a loading station 110, shown in FIG. 5, which will be described in greater detail hereinafter, and equal amounts of dough rods are transported by the buckets 12 above the upper ends of the containers 100. As shown in FIG. 1, the actuating means 22, 21 of a container 100' is in an operative position, and has opened the flaps 16 of a bucket 12 which is located above a compartment 1' which is to be filled.

When the compartment 1' of container 100' has been filled, a pulse is generated by the photoelectric device 10, which operates a switch, not shown, to energize motor 6 so that the gear and rack drive 7, 8 displaces container 100' along the rails 4 until the next following compartment 1' of the respective container 100' is under the bucket conveyor. The actuating means 22, 21 are then held in the operative position until successive buckets 12 have been emptied into the second compartment and filled the same, whereupon container 100' is again displaced along rails 4 by motor 6 under the control of photoelectric means 10 so that the third compartment is located under the bucket conveyor 12, 13.

When the last compartment 1' of container 100' has been filled, the actuating lever 21 of the respective container 100' is moved out of the path of movement of rollers 20 of the buckets 12, and the actuating lever 21 of the next following container 100 is moved into the path of movement of rollers 20 of buckets 12. Such shifting to the next following compartment 1, or to the first compartment of the next following container 100, is repeated until the entire space available in all compartments 1 of all containers 1 is filled.

The emptying of compartments 1 of containers 100 is controlled by the photoelectric device 11 provided for each container 100. When a signal is given to the electromagnet 33, the closure slide 30a of a compartment 1 is retracted, and the respective compartment discharges through the connecting chute 23 and over the weight biassed closure 25 which is opened by the discharged material. A layer of dough rods is thus formed on the conveyor belt 3, and transported to a packing station 120 shown in FIG. 5 which will be described in greater detail hereinafter. When a compartment has become empty, this condition is sensed by the photoelectric sensing means 11 which control motor 6 to move respective container 100 one step to a position in which the lower end of the next following compartment cooperates with the connecting chute 23 for discharge onto the conveyor belt 3.

A particular advantage of the above-described storing and transporting apparatus is that the arrangement permits simultaneous filling of several compartments 1 of several containers 100, and emptying of other compartments 1 of other containers 100. Furthermore, several conveyors 2 for supply, and several conveyors 3 for discharge may be provided in parallel positions so that some of the containers 100 with compartments 1 can be filled with different dough rods, such as spaghetti and macaroni, which are supplied from different supply stations, and transported to different packing stations.

Instead of the bucket conveyor 13, 12, a conveyor belt similar to conveyor 3 may be used. In this event, a second supply conveyor band would have to be provided whose delivery region would have to be constructed displaceable to several positions corresponding to the containers to be filled. In the event that it is desired that the packing station 120 receives the dough rods in portions, the conveyor belt 3 can be replaced by a bucket conveyor similar to bucket conveyor 2, 12, 13, which would require apparatus positioned under the connecting chute and above the respective bucket conveyor for filling equal amounts of dough rods into the buckets of the conveyor.

FIG. 5 illustrates an arrangement of the invention in which the apparatus described above with reference to FIGS. 1 to 4 can be advantageously used. Spaghetti or other dough rods 50 which have been divided into rods of equal length by sawing and drying means schematically indicated at 51, move through chutes 52 and a reversing device 53 which is followed by chutes 54 and 55 provided with baffle guides into the buckets 12 transported by a conveyor chain 13 of the bucket conveyor 2 described above. Closure slides 58 and 59 are provided at the lower end of the chute 55 for separately discharging equal amounts of spaghetti as required by the volume of the buckets 12. When closure 58 is closed, and closure 59 is opened, an amount of spaghetti drops into a bucket 12.

Bucket conveyor 2 is guided over guide rollers 2a and reversed at a guide roller 2b so that the buckets of the upper run are located higher than the buckets 12 of the lower run which cooperate with the containers 100, as described above. The buckets 12 move into the region of the upper end of the intermediate container 60 which is provided with an actuator 71 corresponding to actuator means 21 described with reference to FIG. 3. The lower end of the intermediate container 60 is provided with two closure means 58' and 59' which can be operated to permit discharge of equal amounts of spaghetti into the buckets 61 of another bucket conveyor 62. Buckets 61 transport the spaghetti or other dough rods to packing machines 63 and 64 at a packing station 120. At the upper ends of packing machines 63 and 64, chutes 65 and 66 are provided. Chutes 65 and 66 have at the upper ends, photoelectric sensing means 67, and actuators 68 cooperating with buckets 61, corresponding to the operation of actuating means 21. At the end of bucket conveyor 62 located under the intermediate container 60, photoelectric sensing means 69 are arranged which sense the filling condition of buckets 61 returning at the lower run of conveyor 62 from the packing machines.

In the event that the operation of the packing machines 63 and 64 is disturbed, or that the chutes 65 and 66 are filled to the top due to the fact that the supply of dough rods from buckets 12 of the upper run, container 60, and bucket container 61 exceeded the amount of spaghetti which can be packed by the packing machines 63, 64, the sensing means 67 recognizes the filled condition of chute 65, and generates a signal which causes an electromagnet, not shown, to move actuating means 68 to an inoperative position in which the buckets 61 passing the packing machine 63 are not opened. The full buckets 61 travel along the lower run of bucket conveyor 62 into the region of the photoelectric sensing means 69 which recognize the filled condition of buckets 61. For example, the closure flaps of buckets 61 have openings for the passage of a beam of light which is interrupted by spaghetti in the sensed bucket 61. The photoelectric sensing means 69 responds to a filled bucket by a signal to an electromagnet means, not shown, by which the closure means 59' is held in the closed position. Consequently, spaghetti in the intermediate storage container 60 are not discharged.

If the photoelectric sensing means 70 at the upper end of the intermediate container 60 sense that the intermediate storage container 60 is full, an electromagnet, not shown, is energized to place the actuating lever 71 in the inoperative position in which the passing buckets 12 are not opened. The still filled buckets 12 pass now over the array of containers 100 with compartments 1, as described above, and discharge into the same under the control of photoelectric sensing means 10 controlling the position of actuating levers 21, as described above. Consequently, the voluminous containers 100 are successively filled. The conveyor belt 3, which cooperates with the containers 100, has a delivery end in the region of the upper end of a chute 72 provided with two closure means 73 and 74 controlled by a photoelectric sensing means 75 which senses buckets 61 on the upper run of bucket conveyor 62. At the upper end of chute 72, photoelectric sensing means 76 are provided for sensing the filling condition of chute 72. Photoelectric sensing means 75 senses the filling condition of buckets 61 and controls closure slide 74 to remain closed when the buckets 61 are filled. However, if empty buckets 61 arrive at the lower end of chute 72, this condition is discovered by the photoelectric sensing means 75, and first closure slide 73 is closed, and closure slide 74 is opened so that a certain amount of spaghetti, corresponding to the capacity of buckets 21, is discharged into bucket 61 which now in filled condition moves into the region of the upper end of chute 65 of packing machine 63, or chute 66 of packing machine 64, and is opened by the actuating member 68. If photoelectric means 67 determines that chute 65 is filled to capacity, actuating member 68 is moved to an inoperative position in which the full buckets 61 move first to the chute 66 of the packing machine 64, and are opened by actuator means 68, if chute 66 is not filled as determined by photoelectric sensing means 67. When sensing means 67 of both packing machines 63, 64 sense a full condition of chutes 65 and 66, the buckets 61 remain closed. When the photoelectric sensing means 76 sense a full condition in chute 72, conveyor 3 is stopped, and flap 25 of the emptying container department 1 is closed. A similar arrangement for stopping bucket conveyor 62 may be provided.

It will be understood that each of the elements described above, or two or more together, may also find a useful application in other types of methods of processing rod-shaped dough differing from the types described above.

While the invention has been illustrated and described as embodied in a method and apparatus for transporting, storing, and packing spaghetti, macaroni, and other extruded dough products, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for transporting and storing rods of substantially equal length, comprising at least one row of a predetermined number of adjacent container compartments forming an integral container, each container compartment being elongated in a vertical direction and having a width matching the length of said rods, said compartments having upper and lower ends located in first and second horizontal planes, respectively; first transporting means located above said first plane for supplying equal amounts of said rods successively into the upper end of each container compartment; second transporting means for transporting away rods discharged from said lower end of each container compartment; closure means for selectively closing and opening said lower end of each container compartment for storing of rods in said compartment, and for discharging of rods onto said second transporting means, respectively; and rail means parallel to said row and supporting said container adjacent the upper and lower ends for movement across said first and second transporting means so that said container compartments can be selectively filled by said first transporting means and selectively emptied onto said second transporting means.

2. Apparatus as claimed in claim 1 comprising a plurality of rows of a predetermined number of said adjacent container compartments, forming a series of integral of containers, said rows being arranged parallel and spaced from each other; and a series of said rail means parallel to said rows and supporting said containers, respectively, for movement across said first and second transporting means.

3. Apparatus as claimed in claim 2 wherein said first transporting means include bucket conveyor means extending across said rail means and having spaced buckets, each bucket holding said amount of rods.

4. Apparatus as claimed in claim 3 wherein each bucket includes closing means having a normal closed position for closing the bucket, and an open position for discharge from said bucket into the upper end of a container compartment; and further comprising a stationarily supported actuating means correlated with each container and located under said bucket conveyor for successive cooperation with said compartments of the respective container, said actuating means being settable to an operative position engaging and opening said closing means of the bucket which is located above the respective container compartment so that said bucket discharges into the respective container compartment, and to an inoperative position in which buckets of said bucket conveyor pass the respective container compartment with said closing means in said closed position.

5. Apparatus as claimed in claim 2 comprising drive means for each container for moving the respective container along said rail means to positions in which said container compartments thereof are successively located under said first transporting means.

6. Apparatus as claimed in claim 2 wherein said closure means include a closure slide at the lower end of each compartment of each container; and further comprising an operating means correlated with each said container and operable to operate said closure slide of each container compartment of the respective correlated container.

7. Apparatus as claimed in claim 2 further comprising a stationary connecting chute means above said second transporting means, correlated with each container and cooperating with the lower ends of said container compartments of the respective correlated container moving along said rail means.

8. Apparatus as claimed in claim 7 wherein said connecting chute means include a connecting chute and a weight biased closure for the lower end of said chute.

9. Apparatus as claimed in claim 7 wherein said connecting chute means includes a chute spaced from said lower end of the respective container compartment of the respective container, and a connecting ring for connecting the upper end of said chute with the lower end of the respective container compartment; and comprising operating means for moving said connecting ring between an inoperative position spaced from said lower end, and an operative position connected with said lower end so that when said closure means opens said lower end, said rods can flow through said connecting ring and said connecting chute onto said second transporting means.

10. Apparatus as claimed in claim 1, wherein each of said compartments is provided in the interior thereof with a zig-zag baffle guide preventing misalignment of the rods during filling and emptying of the respective compartment.

* * * * *